(12) United States Patent
Uchida (10) Patent No.: US 9,254,739 B2
(45) Date of Patent: Feb. 9, 2016

(54) VEHICLE

(71) Applicant: Toyota Jidosha Kabushiki Kaisha, Toyota-shi, Aichi-ken (JP)

(72) Inventor: Kenji Uchida, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/493,910

(22) Filed: Sep. 23, 2014

(65) Prior Publication Data
US 2015/0148186 A1 May 28, 2015

(30) Foreign Application Priority Data

Nov. 26, 2013 (JP) .................................. 2013-243971

(51) Int. Cl.
*B60W 10/08* (2006.01)
*B60W 10/10* (2012.01)
*B60K 6/42* (2007.10)

(52) U.S. Cl.
CPC ................ *B60K 6/42* (2013.01); *Y10S 903/915* (2013.01)

(58) Field of Classification Search
None
See application file for complete search history.

(56) References Cited

U.S. PATENT DOCUMENTS

| 6,098,733 | A | 8/2000 | Ibaraki et al. |
| 2002/0084120 | A1* | 7/2002 | Beasley ........................ 180/65.3 |
| 2003/0078134 | A1* | 4/2003 | Kojima et al. .................... 477/3 |
| 2007/0078039 | A1* | 4/2007 | Antony et al. .................... 477/5 |
| 2008/0093137 | A1* | 4/2008 | Maeda et al. .................. 180/65.2 |

FOREIGN PATENT DOCUMENTS

| JP | H09-117008 A | 5/1997 |
| JP | 2011-235750 A | 11/2011 |
| JP | 2013-180645 A | 9/2013 |

* cited by examiner

*Primary Examiner* — Edwin A Young
(74) *Attorney, Agent, or Firm* — Dinsmore & Shohl LLP (57) ABSTRACT

A vehicle includes an engine, first and second motor generators, a power split device, a propeller shaft, an automatic transmission, and an ECU. The power split device includes a carrier, a sun gear, and a ring gear respectively coupled to a crankshaft of the engine, a rotor of the first motor generator, and a rotation shaft of the second motor generator. The automatic transmission is provided between the second motor generator and a propeller shaft. When the first motor generator has a malfunction, the ECU restricts gear shift performed by the automatic transmission, as compared with a case where the second motor generator has a malfunction.

8 Claims, 7 Drawing Sheets

|  | C1 | C2 | B1 | B2 | F1 |
|---|---|---|---|---|---|
| 1st | O |  |  | (O) | O |
| 2nd | O |  | O |  |  |
| 3rd | O | O |  |  |  |
| 4th |  | O | O |  |  |
| R | O |  |  | O |  |
| N |  |  |  |  |  |

O : ENGAGED
(O): ENGAGED UPON ENGINE BRAKE

VEHICLE

This nonprovisional application is based on Japanese Patent Application No. 2013-243971 filed on Nov. 26, 2013 with the Japan Patent Office, the entire contents of which are hereby incorporated by reference.

BACKGROUND OF THE INVENTION

1. Field of the Invention

The present invention relates to a vehicle, in particular, a vehicle including first and second rotating electrical machines.

2. Description of the Background Art

A hybrid vehicle including an engine and first and second motor generators (rotating electrical machines) as a driving system has been known. In such a hybrid vehicle, when the driving system has a malfunction, retreat traveling control may be performed depending on a location of the malfunction. The retreat traveling control is control for continuing traveling temporarily, rather than stopping the vehicle immediately. Accordingly, the driver can retreat the vehicle to a safe place or can move the vehicle to a repair shop. For example, a hybrid vehicle disclosed in Japanese Patent Laying-Open No. 2011-235750 includes retreat traveling control means provided in preparation for occurrence of abnormality in output of the second motor generator.

SUMMARY OF THE INVENTION

Hybrid vehicles have been sold in each of which an automatic transmission is provided at an output shaft of the above-described driving system. In this driving system, the first motor generator mainly functions as a generator while the second motor generator mainly functions as a motor. The functions of the first and second motor generators are thus different from each other, so that it is desirable to perform appropriate retreat traveling control depending on a motor generator having a malfunction. This is because a retreat traveling distance can be made longer by performing appropriate retreat traveling control. However, conventionally, in the hybrid vehicle including the above-described automatic transmission, there has not been proposed retreat traveling control according to the function of the motor generator having the malfunction.

The present invention has been made to solve the foregoing problem and has an object to provide a longer retreat traveling distance of a hybrid vehicle including an automatic transmission.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The following describes an embodiment of the present invention in detail with reference to figures. It should be noted that the same or corresponding portions in the figures are given the same reference characters and are not described repeatedly.

Figure 1:
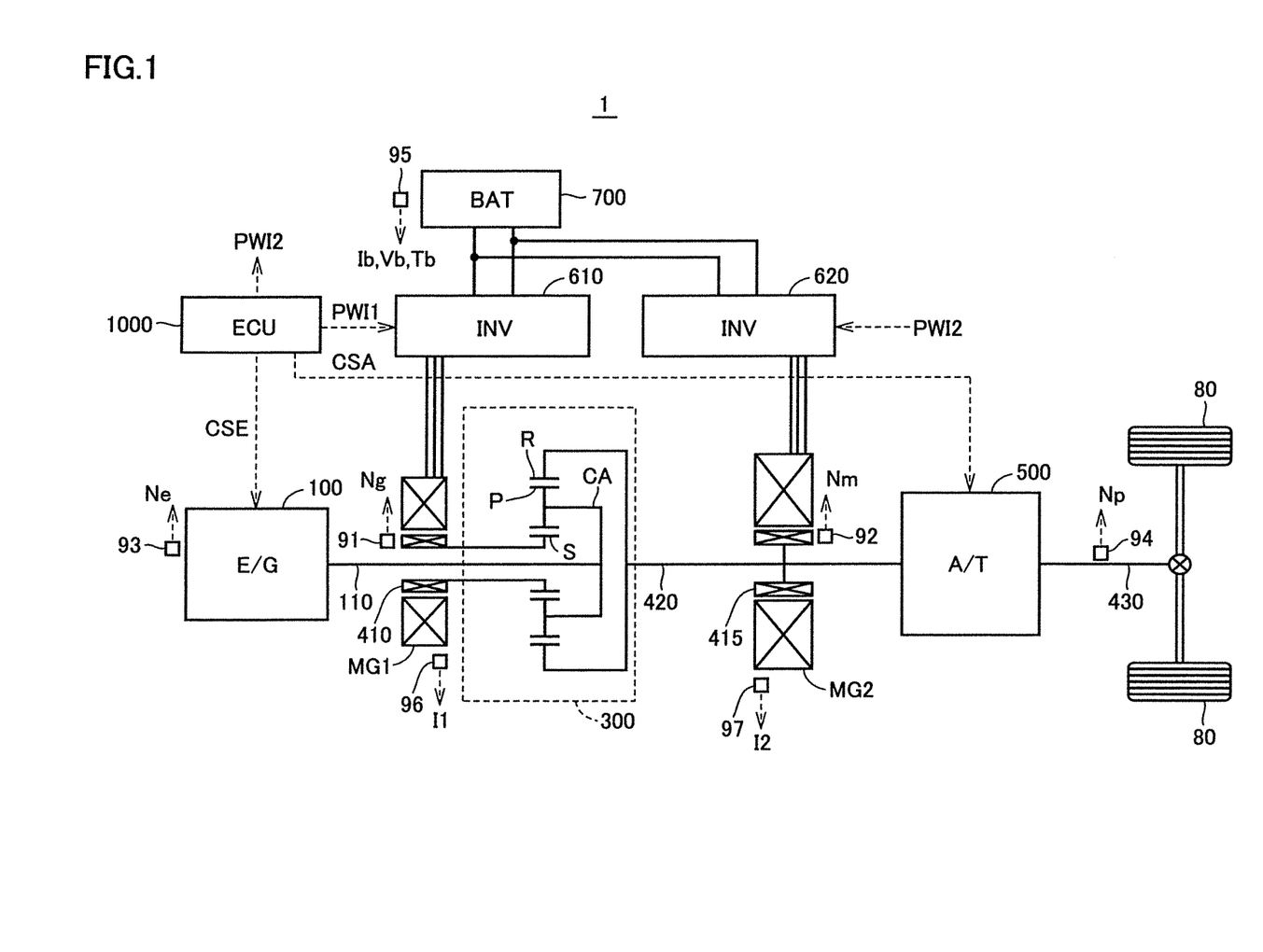
FIG. 1 is a block diagram schematically showing a configuration of the whole of a vehicle according to an embodiment.

FIG. 1 is a block diagram schematically showing a configuration of the whole of a vehicle according to the embodiment. With reference to FIG. 1, a vehicle 1 includes an engine (E/G) 100, motor generators MG1, MG2, a power split device 300, an automatic transmission (A/T) 500, inverters (NV) 610, 620, a battery (BAT) 700, and an electronic control unit (ECU) 1000.

Engine 100 generates power for rotating a driving wheel 80 based on a control signal CSE from ECU 1000. The power generated by engine 100 is output to power split device 300.

Power split device 300 divides the power received from engine 100 into power to be transmitted to driving wheel 80 and power to be transmitted to motor generator MG1. Power split device 300 is a planetary gear mechanism, and includes a sun gear S, a ring gear R, a carrier CA and a pinion gear P.

Sun gear S is coupled to a rotor 410 (rotation shaft) of motor generator MG1. Ring gear R is coupled to a rotation shaft 415 of motor generator MG2. Pinion gear P is engaged with sun gear S and ring gear R. Carrier CA rotatably and revolvably holds pinion gear P. Carrier CA is coupled to crankshaft 110 (output shaft) of engine 100. It should be noted that carrier CA, sun gear S, and ring gear R correspond to "first to third rotating elements", respectively.

Each of motor generators MG1, MG2 (first and second rotating electrical machines) is an AC rotating electrical machine and can function as a motor and a generator. Motor generator MG1 mainly functions as a generator whereas motor generator MG2 mainly functions as a motor.

Automatic transmission 500 is a multi-stage transmission having a plurality of gear shift stages in the present embodiment. Automatic transmission 500 is provided between motor generator MG2 and a propeller shaft 430. More specifically, the rotor of motor generator MG2 is connected to a drive shaft 420 that couples ring gear R of power split device 300 to the rotation shaft (hereinafter, referred to as "input shaft 440") of gear 440 of the input shaft of automatic transmission 500 (see FIG. 2). It should be noted that automatic transmission 500 may be a continuously variable transmission.

Figure 2:
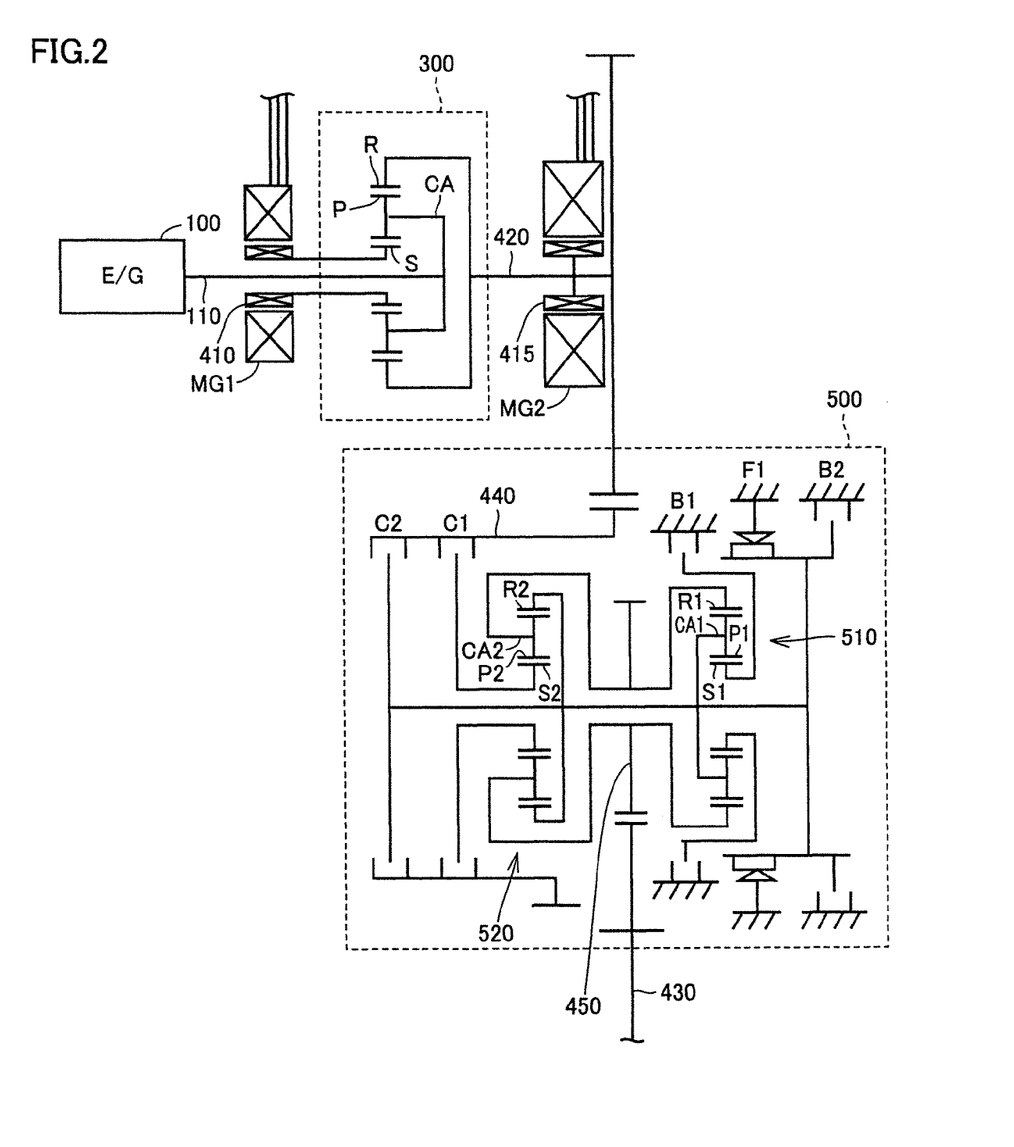
FIG. 2 shows a configuration of an automatic transmission shown in FIG. 1 in detail.

FIG. 2 shows the configuration of automatic transmission 500 shown in FIG. 1 in detail. While FIG. 1 schematically shows automatic transmission 500, FIG. 2 illustrates a coupling relation between the input shaft and output shaft of automatic transmission 500 in detail.

With reference to FIG. 2, automatic transmission 500 includes single pinion type planetary gears 510, 520, clutches C1, C2, brakes B1, B2, and a one-way clutch F1. Planetary gear 510 has a sun gear S1, a ring gear R1, a carrier CA1, and a pinion gear P1. Planetary gear 520 has a sun gear S2, a ring gear R2, a carrier CA2, and a pinion gear P2.

Each of clutches C1, C2 and brakes B1, B2 is a friction engagement device, which operates hydraulically. When clutch C1 is engaged, sun gear S2 is coupled to ring gear R of power split device 300. Accordingly, sun gear S2 is rotated at the same speed as that of ring gear R.

Carrier CA1 of planetary gear 510 and ring gear R2 of planetary gear 520 are coupled to each other. Therefore, when clutch C2 is engaged, each of carrier CA1 and ring gear R2 is coupled to ring gear R of power split device 300. Accordingly, carrier CA1 and ring gear R2 are rotated at the same speed as that of ring gear R.

When brake B1 is engaged, the rotation of sun gear S1 is stopped. When brake B2 is engaged, the rotations of carrier CA1 and ring gear R2 are stopped. One-way clutch F1 supports carrier CA1 and ring gear R2 such that they can be rotated in one direction and cannot be rotated in the opposite direction.

Automatic transmission 500 is switched to any one of an engagement state, a slip state, and a release state by changing the engagement state of each of the friction engagement devices (clutches C1, C2 and brakes B1, B2). In the engagement state, the whole of torque of input shaft 440 of automatic transmission 500 is transmitted to output shaft 450 of automatic transmission 500. In the slip state, a part of torque of input shaft 440 of automatic transmission 500 is transmitted to output shaft 450 of automatic transmission 500. In the release state, the transmission of torque is cut off between input shaft 440 and output shaft 450 of automatic transmission 500.

Automatic transmission 500 is capable of switching a gear shift ratio (a ratio of the rotation speed of input shaft 440 to the rotation speed of output shaft 450) based on a control signal CSA from ECU 1000.

Figure 3:
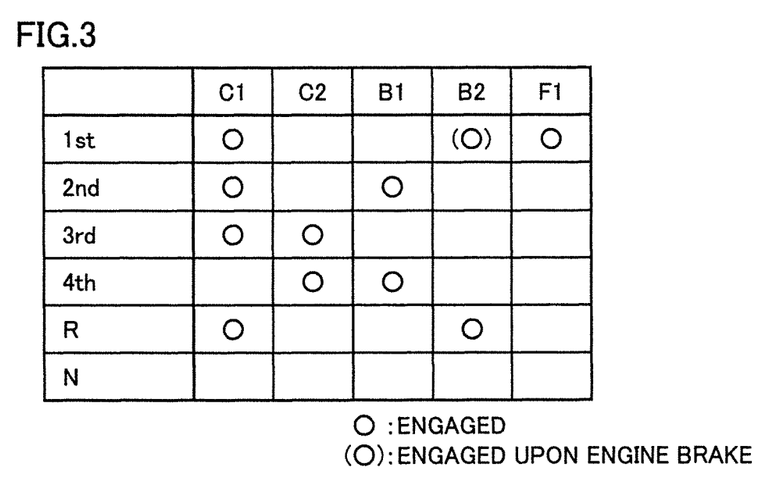
FIG. 3 shows an engagement operation table for the automatic transmission shown in FIG. 2.

FIG. 3 shows an engagement operation table for automatic transmission 500 shown in FIG. 2. With reference to FIG. 3, a symbol "O" represents the engagement state, a symbol "(O)" represents engagement attained in the event of engine brake, and a blank column represents the release state.

In automatic transmission 500, when the friction engagement devices are engaged in accordance with the engagement operation table, four forwarding gear stages (a first speed gear stage to a fourth speed gear stage (indicated as 1st to 4th) and a reverse gear stage (indicated as R) are selectively formed. The first speed gear stage corresponds to a "first speed stage". Meanwhile, by bringing all the friction engagement devices into the release state, a neutral state (indicated as N) is formed. It should be noted that the configuration of the automatic transmission shown in FIG. 2 and the engagement operation table shown in FIG. 3 are just exemplary and the present invention is not limited to these.

With reference to FIG. 1 again, battery 700 (power storage device) stores DC power for driving motor generators MG1, MG2. For battery 700, a nickel-hydrogen battery, a lithium ion battery, or a capacitor can be employed, for example.

Inverters 610, 620 are connected to battery 700 in parallel with each other. Inverters 610, 620 respectively convert DC power supplied from battery 700 into AC powers based on control signals PWI1, PWI2 from ECU 1000. The AC powers converted by inverters 610, 620 are supplied to motor generators MG1, MG2, respectively.

Vehicle 1 further includes resolvers 91, 92, an engine speed sensor 93, a vehicle speed sensor 94, a monitoring sensor 95, and overcurrent sensors 96, 97. Resolver 91 detects a rotation speed (MG1 rotation speed Ng) of motor generator MG1. Resolver 92 detects a rotation speed (MG2 rotation speed Nm) of motor generator MG2. Engine speed sensor 93 detects a rotation speed (engine speed Ne) of engine 100. Vehicle speed sensor 94 detects a rotation speed (propeller shaft rotation speed Np) of propeller shaft 430. Monitoring sensor 95 detects a state (battery voltage Vb, battery current Ib, battery temperature Tb) of battery 700. Overcurrent sensor 96 detects an overcurrent (current I1) of motor generator MG1. Overcurrent sensor 97 detects an overcurrent (current I2) of motor generator MG2. Each sensor outputs a detection result to ECU 1000.

ECU 1000 includes a CPU (Central Processing Unit) and a memory (both not shown). The memory has a below-described gear shift diagram stored therein, for example. ECU 1000 performs a predetermined calculation process based on information stored in the memory and information from each sensor, and controls each device based on the result of calculation process.

In the configuration, vehicle 1 can travel only using driving power from motor generator MG2 with engine 100 being nonoperational. Hereinafter, the traveling with engine 100 being nonoperational will be also referred to as "EV traveling". On the other hand, the traveling with engine 100 being operational will be also referred to as "HV traveling".

<During Normal Operation>

Figure 4:
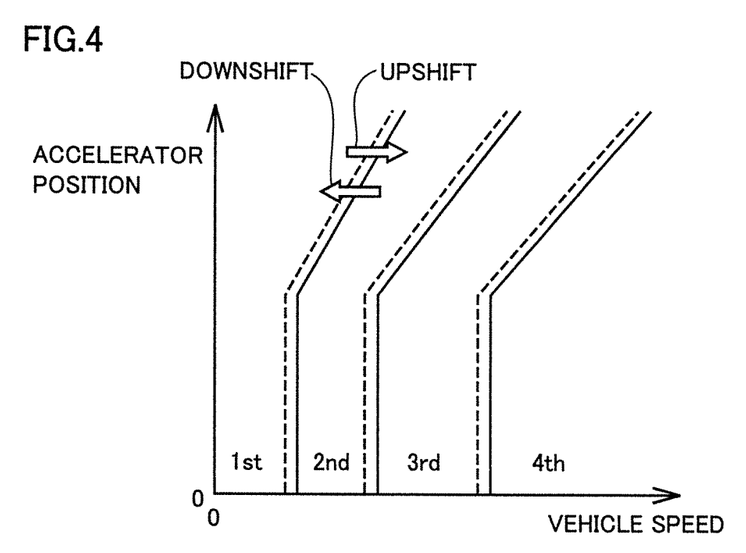
FIG. 4 is a gear shift diagram used during a normal operation of each of motor generators MG1, MG2.

FIG. 4 is a gear shift diagram used during a normal operation of each of motor generators MG1, MG2. With reference to FIG. 4, the horizontal axis represents the vehicle speed and the vertical axis represents the accelerator position.

As described above, automatic transmission 500 is configured to be capable of forming one of the first to fourth speed gear stages. In the gear shift diagram, an upshift line (indicated by a solid line) and a downshift line (indicated by a broken line) are set for each type of gear shift (a combination of a gear stage before gear shift and a gear stage after gear shift).

ECU 1000 controls automatic transmission 500 to upshift when the vehicle speed is increased to be equal to or more than the vehicle speed defined by the upshift line. On the other hand, ECU 1000 controls automatic transmission 500 to downshift when the vehicle speed is decreased to be less than the vehicle speed defined by the downshift line.

Further, when the accelerator position is decreased to be less than the accelerator position defined by the upshift line, ECU 1000 controls automatic transmission 500 to upshift. On the other hand, when the accelerator position is increased to be equal to or more than the accelerator position defined by the downshift line, ECU 1000 controls automatic transmission 500 to downshift.

Figure 5:
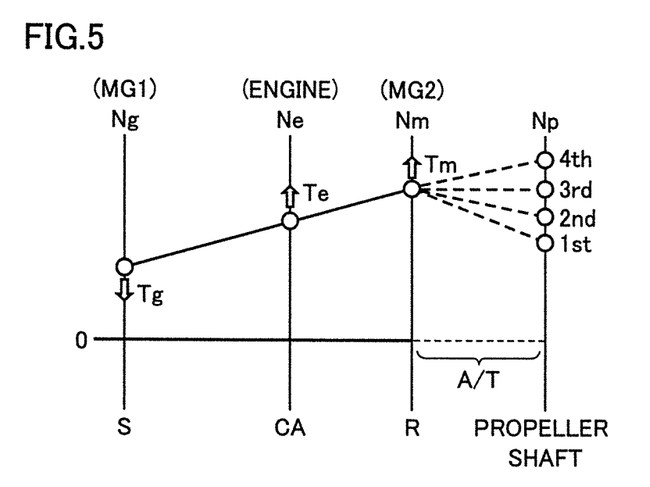
FIG. 5 is a nomographic chart for a power split device during the normal operation of each of motor generators MG1, MG2.

FIG. 5 is a nomographic chart for power split device 300 during the normal operation of each of motor generators MG1, MG2. FIG. 5 shows a nomographic chart during the HV traveling.

During the HV traveling, engine 100 is operated, so that engine speed Ne is positive. Each of MG1 rotation speed Ng and MG2 rotation speed Nm is changed according to the traveling state of vehicle 1. It should be noted that with power split device 300 being configured as described above, the rotation speed (MG1 rotation speed Ng) of sun gear S, the rotation speed (engine speed Ne) of carrier CA, and the rotation speed (MG2 rotation speed Nm) of ring gear R has such a relation that they are connected to one another in a straight line in the nomographic chart. In other words, when the rotation speeds of any two of the rotating elements are determined, the rotation speed of the remaining rotating element is also determined.

Propeller shaft 430 is rotated using MG1 torque Tg, engine torque Te, and MG2 torque Tm. In the present embodiment, automatic transmission 500 is provided between ring gear R of power split device 300 and propeller shaft 430. It should be noted that propeller shaft 430 corresponds to a "drive shaft".

A ratio between MG2 rotation speed Nm and propeller shaft rotation speed Np is determined according to a gear stage of automatic transmission 500. In the present embodiment, when automatic transmission 500 forms the third speed gear stage, MG2 rotation speed Nm and propeller shaft rotation speed Np are equal to each other. In other words, the gear shift ratio is 1. This indicates that the third speed gear stage is a direct connection stage. The direct connection stage will be described in detail later.

<During Malfunction of Motor Generator MG1>

Motor generator MG1 may have a malfunction. ECU 1000 can determine that motor generator MG1 has a malfunction when a detection result from resolver 91, monitoring sensor 95, or overcurrent sensor 96 indicates an abnormal value. It should be noted that the malfunction of motor generator MG1 includes a malfunction of each of the sensors for detecting a state of motor generator MG1.

Figure 6:
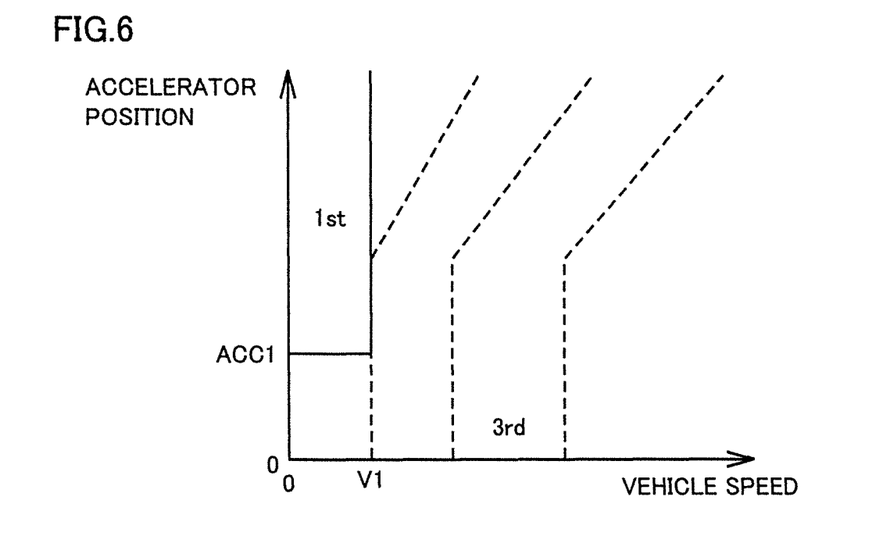
FIG. 6 is a gear shift diagram used when motor generator MG1 has a malfunction.
Figure 7:
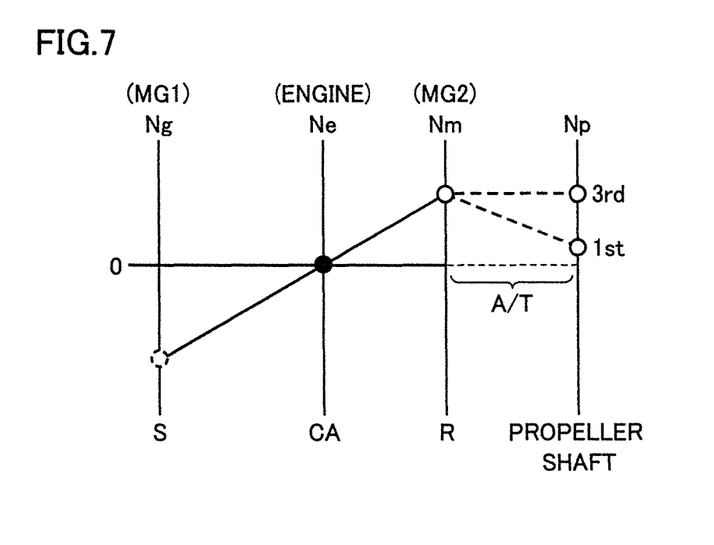
FIG. 7 is a nomographic chart for the power split device when motor generator MG1 has a malfunction.

FIG. 6 is a gear shift diagram used when motor generator MG1 has a malfunction. FIG. 7 is a nomographic chart for power split device 300 when motor generator MG1 has a malfunction. FIG. 6 and FIG. 7 are respectively compared with FIG. 4 and FIG. 5. In FIG. 6, for comparison, each upshift line for the normal operation (see FIG. 4) is indicated by a broken line.

In the present embodiment, when motor generator MG1 has a malfunction, the EV traveling is performed. During the EV traveling, crankshaft 110 is fixed by the brake (not shown). Accordingly, as shown in FIG. 7, engine speed Ne is fixed to 0. Vehicle 1 travels by motor generator MG2 consuming electric power stored in battery 700. In other words, propeller shaft 430 is rotated only using MG2 torque Tm. On this occasion, motor generator MG1 is rotated according to the rotation of motor generator MG2.

Forwarding gear stages that can be selected by ECU 1000 when motor generator MG1 has a malfunction are restricted to the first speed gear stage and the third speed gear stage. In the gear shift diagram (FIG. 6) used when motor generator MG1 has a malfunction, a region indicating the third speed gear stage (direct connection stage) is larger than that in the gear shift diagram (FIG. 4) used when motor generator MG1 does not have a malfunction. In other words, the gear shift diagram shown in FIG. 6 is a gear shift diagram for switching between the direct connection stage and the first speed gear stage, which has a larger gear shift ratio than that in the direct connection stage. On the other hand, the gear shift diagram shown in FIG. 4 is a gear shift diagram for switching among more gear stages than those in the gear shift diagram shown in FIG. 6.

As shown in FIG. 6, when the accelerator position is less than a predetermined value ACC1 or when the vehicle speed is more than a predetermined value V1, the third speed gear stage is selected. In other words, when motor generator MG1 has a malfunction, ECU 1000 controls automatic transmission 500 such that the direct connection stage, which has a gear shift ratio of 1, is selected among the plurality of gear stages. This is because efficiency (transmission efficiency) of transmitting the torque of input shaft 440 of automatic transmission 500 to output shaft 450 is the highest in the third speed gear stage. The following describes a reason why the transmission efficiency in the third speed gear stage is thus high.

As shown in the engagement operation table (see FIG. 3), in the third speed gear stage, both clutches C1, C2 are engaged. With reference to FIG. 2 again, when clutch C1 is engaged, sun gear S2 is coupled to ring gear R of power split device 300. When clutch C2 is engaged, ring gear R2 is coupled to ring gear R. Accordingly, when both clutches C1, C2 are engaged, sun gear S2 and ring gear R2 are rotated at the same speed as that of ring gear R. In other words, all the rotating elements (sun gear S2, ring gear R2, carrier CA2, and pinion gear P2) in planetary gear 520 are rotated together. Accordingly, a loss resulting from the engagement between the rotating elements in planetary gear 520 is smaller than those in the other gear stages.

Further, ring gear R1 and carrier CA2 are coupled to each other. Moreover, carrier CA1 and ring gear R2 are coupled to each other. Accordingly, when carrier CA2 of planetary gear 520 and ring gear R2 are rotated at the same speed, ring gear R1 of planetary gear 510 and carrier CA1 are also rotated at the same speed. In other words, when both clutches C1, C2 are engaged, all the rotating elements (sun gear S1, ring gear R1, carrier CA1, and pinion gear P1) in planetary gear 510 are rotated together. Accordingly, a loss resulting from the engagement between the rotating elements in planetary gear 510 is smaller than those in the other gear stages.

Thus, when the third speed gear stage is selected, i.e., when the direct connection stage is selected, all the rotating elements (sun gears S1, S2, ring gears R1, R2, carriers CA1, CA2, and pinion gears P1, P2) in automatic transmission 500 are rotated together. Thus, the loss resulting from the engagement between the rotating elements is less than those in the other gear stages, thereby reducing loss in the whole of automatic transmission 500. Accordingly, the transmission efficiency can be made the highest, thereby achieving a longer retreat traveling distance.

However, if the forwarding gear stage that can be selected by ECU 1000 is restricted only to the third speed gear stage, it is considered that sufficient driving power cannot be supplied when large driving power is required. Accordingly, ECU 1000 selects the first speed gear stage when the accelerator position is more than predetermined value ACC1 and the vehicle speed is less than predetermined value V1, as shown in FIG. 6. In this way, sufficient driving power can be supplied.

<During Malfunction of Motor Generator MG2>

Although motor generator MG2 also may have a malfunction, the malfunction of motor generator MG2 is the same as the malfunction of motor generator MG1, so that it will not be repeatedly described in detail. When motor generator MG2 has a malfunction, traveling needs to be performed using the directly transmitted torque while generating electric power using motor generator MG1. The directly transmitted torque is torque directly transmitted from engine 100 to propeller shaft 430 via power split device 300 mechanically.

The following describes control in the case where motor generator MG2 has a malfunction while comparing the present embodiment with a comparative example in which automatic transmission 500 is not provided. It should be noted that the configuration of the vehicle according to the comparative example is the same as the configuration of vehicle 1 (see FIG. 1) except that no automatic transmission 500 is provided, so that detailed description therefor will not be repeated.

Figure 8:
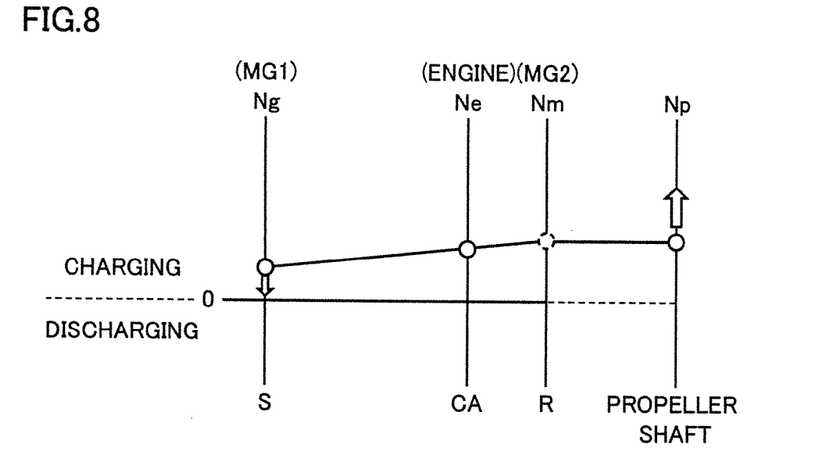
FIG. 8 is a nomographic chart for the power split device when motor generator MG2 has a malfunction in a comparative example.

FIG. 8 is a nomographic chart for power split device 300 when motor generator MG2 has a malfunction in the comparative example. With reference to FIG. 8, engine speed Ne is determined according to a torque to be output by engine 100. Therefore, ECU 1000 cannot arbitrarily change engine speed Ne. In order to facilitate understanding, the description below assumes that engine speed Ne is fixed.

When automatic transmission 500 is not provided, MG2 rotation speed Nm is set according to propeller shaft rotation speed Np and propeller shaft rotation speed Np is proportional to the vehicle speed. That is, although MG2 rotation speed Nm is set according to the vehicle speed, the vehicle speed is determined in proportion to the rotation speed of driving wheel 80 at each time, rather than a parameter controllable actively by ECU 1000. Accordingly, in the comparative example, ECU 1000 cannot control MG2 rotation speed Nm.

When engine speed Ne and MG2 rotation speed Nm are set, MG1 rotation speed Ng is set such that the respective rotation speeds of the rotating elements are on a straight line in the nomographic chart. Since ECU 1000 cannot control MG2 rotation speed Nm, ECU 1000 cannot control whether MG1 rotation speed Ng becomes positive or negative.

In battery 700, charging and discharging are switched therebetween in accordance with whether MG1 rotation speed Ng is positive or negative (i.e., the rotation direction of sun gear S). When MG1 rotation speed Ng is positive (when sun gear S is rotated in the forward direction), motor generator MG1 generates electric power. The electric power generated by motor generator MG1 is charged to battery 700. Accordingly, when the state in which MG1 rotation speed Ng is positive is continued, battery 700 may be charged with an amount of electric power more than an amount of electric power that can be stored in battery 700.

On the other hand, when MG1 rotation speed Ng is negative (when sun gear S is rotated in the reverse direction), motor generator MG1 consumes electric power stored in battery 700. Accordingly, when the state in which MG1 rotation speed Ng is negative is continued, battery 700 may be brought into an overdischarged state.

Figure 9:
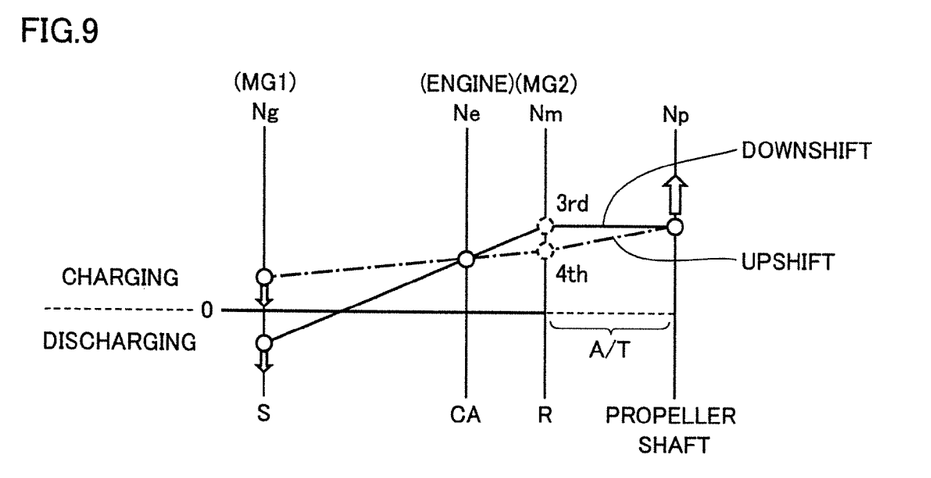
FIG. 9 is a nomographic chart for the power split device when motor generator MG2 has a malfunction in the present embodiment.

FIG. 9 is a nomographic chart for power split device 300 when motor generator MG2 has a malfunction in the present embodiment. With reference to FIG. 9, as with the comparative example shown in FIG. 8, engine speed Ne at each time is set according to a torque to be output by engine 100. Meanwhile, propeller shaft rotation speed Np is set according to the vehicle speed.

In the present embodiment, vehicle 1 includes automatic transmission 500. When the third speed gear stage is selected, MG2 rotation speed Nm is equal to propeller shaft rotation speed Np. When MG1 rotation speed Ng is set in the nomographic chart based on engine speed Ne and MG2 rotation speed Nm, MG1 rotation speed Ng is negative in the third speed gear stage. On the other hand, when the fourth speed gear stage is selected, MG2 rotation speed Nm is lower than propeller shaft rotation speed Np and MG1 rotation speed Ng is positive in the fourth speed gear stage.

Thus, based on engine speed Ne and MG2 rotation speed Nm at each time, ECU 1000 finds a combination of a gear stage in which MG1 rotation speed Ng becomes positive and a gear stage in which MG1 rotation speed Ng becomes negative.

When battery 700 needs to be discharged (more specifically, when the SOC (State Of Charge; a quantity of state indicating a charge state in battery 700) of battery 700 is higher than a predetermined threshold value), ECU 1000 controls automatic transmission 500 to downshift from the fourth speed gear stage to the third speed gear stage. In this way, battery 700 can be discharged.

On the other hand, when battery 700 needs to be charged (more specifically, when the SOC of battery 700 is lower than another threshold value), ECU 1000 controls automatic transmission 500 to upshift from the third speed gear stage to the fourth speed gear stage. In this way, battery 700 can be charged. As described above, according to the present embodiment, by switching between the gear stages of automatic transmission 500, battery 700 can be controlled to be charged and discharged.

It should be noted that in the description above, the third speed gear stage is selected when battery 700 needs to be discharged. However, battery 700 can be discharged also when the first speed gear stage or the second speed gear stage is selected. In other words, when motor generator MG2 has a malfunction, all the four gear stages can be selected although the gear stages cannot be arbitrarily switched between each of the first to third speed gear stages and the fourth speed gear stage since the SOC of battery 700 needs to be maintained to fall within an appropriate range.

On the other hand, when motor generator MG1 has a malfunction, the number of gear stages that can be selected is restricted to only two stages (the first speed gear stage and the third speed gear stage). Thus, when motor generator MG1 has a malfunction, the restriction on gear shift is more severe than that in the case where motor generator MG2 has a malfunction. In other words, when motor generator MG1 has a malfunction, ECU 1000 controls automatic transmission 500 to restrict the gear shift as compared with the case where motor generator MG2 has a malfunction. More specifically, when motor generator MG1 has a malfunction, ECU 1000 controls automatic transmission 500 such that the gear shift ratio of automatic transmission 500 becomes 1.

As described above, when motor generator MG2 has a malfunction, ECU 1000 causes automatic transmission 500 to perform gear shift, based on the SOC of battery 700. On the other hand, when motor generator MG1 has a malfunction, ECU 1000 does not cause automatic transmission 500 to perform gear shift based on the SOC of battery 700.

Figure 10:
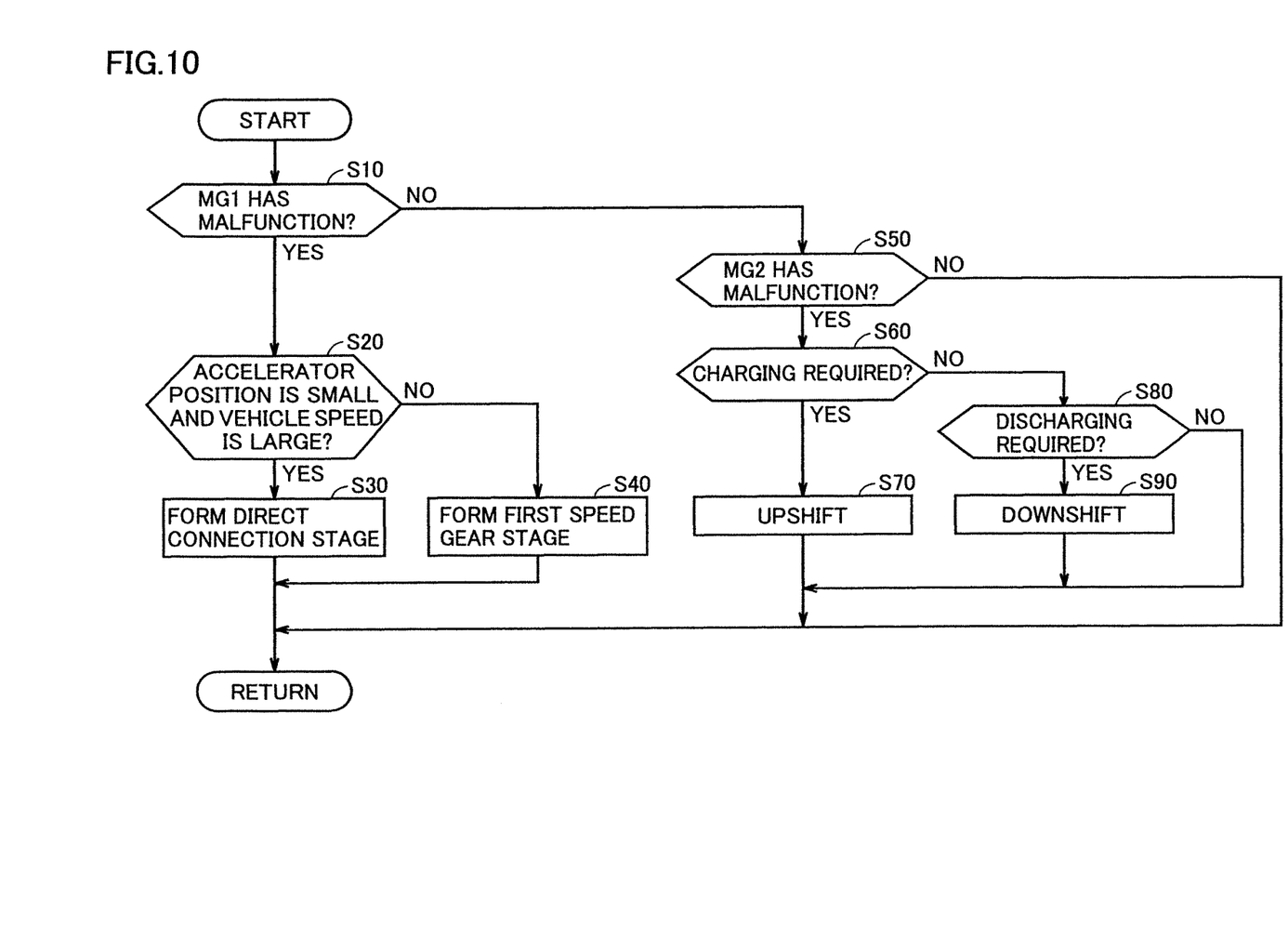
FIG. 10 is a flowchart showing an ECU controlling the automatic transmission.

FIG. 10 is a flowchart showing ECU 1000 controlling automatic transmission 500. With reference to FIG. 10, the process shown in this flowchart is performed whenever a predetermined period has passed or a predetermined condition is established, for example. At the time of start of this process, the gear shift diagram for the normal operation (see FIG. 4) is used.

In a step S10, ECU 1000 determines whether or not motor generator MG1 has a malfunction. When motor generator MG1 has a malfunction (YES in step S10), ECU 1000 brings the process to a step S20. On the other hand, when motor generator MG1 does not have a malfunction (NO in step S10), ECU 1000 brings the process to a step S50.

In step S20, ECU 1000 switches the gear shift diagram shown in FIG. 4 to the gear shift diagram shown in FIG. 6. Based on the gear shift diagram shown in FIG. 6, ECU 1000 determines whether or not the accelerator position is less than predetermined value ACC1 and determines whether or not the vehicle speed is more than predetermined value V1. When the accelerator position is less than predetermined value ACC1 or when the vehicle speed is more than predetermined value V1 (YES in step S20), ECU 1000 brings the process to a step S30. On the other hand, when the accelerator position is more than predetermined value ACC1 and when the vehicle speed is less than predetermined value V1 (NO in step S20), ECU 1000 brings the process to a step S40.

In step S30, ECU 1000 controls automatic transmission 500 to form the direct connection stage. That is, step S30 corresponds to a step of controlling automatic transmission 500 to restrict gear shift when motor generator MG1 has a malfunction, as compared with a case where motor generator MG2 has a malfunction. Then, ECU 1000 returns the process to a main routine, and the series of processes shown in FIG. 10 are repeated.

In step S40, ECU 1000 controls automatic transmission 500 to form the first speed gear stage. Then, ECU 1000 returns the process to the main routine, and the series of processes shown in FIG. 10 are repeated.

In step S50, ECU 1000 determines whether or not motor generator MG2 has a malfunction. When motor generator MG2 has a malfunction (YES in step S50), ECU 1000 brings the process to a step S60. On the other hand, when motor generator MG2 does not have a malfunction (NO in step S50), ECU 1000 returns the process to the main routine and the series of processes shown in FIG. 10 are repeated.

In step S60, ECU 1000 determines whether or not battery 700 needs to be charged. This determination can be performed based on the SOC of battery 700 as described above. When battery 700 needs to be charged (YES in step S60), ECU 1000 brings the process to a step S70. On the other hand, when battery 700 does not need to be charged (NO in step S60), ECU 1000 brings the process to a step S80.

In step S70, ECU 1000 controls automatic transmission 500 to upshift from the third speed gear stage to the fourth speed gear stage. Accordingly, MG1 rotation speed Ng becomes positive, so that battery 700 is charged. Accordingly, the electric power of battery 700 can be prevented from being insufficient or battery 700 can be prevented from being brought into the overdischarged state. Then, ECU 1000 returns the process to the main routine, and the series of processes shown in FIG. 10 are repeated.

In step S80, ECU 1000 determines whether or not battery 700 needs to be discharged. When battery 700 needs to be discharged (YES in step S80), ECU 1000 brings the process to a step S90. On the other hand, when battery 700 does not need to be discharged (NO in step S80), ECU 1000 returns the process to the main routine, and the series of processes shown in FIG. 10 are repeated.

In step S90, ECU 1000 controls automatic transmission 500 to downshift from the fourth speed gear stage to the third speed gear stage. Accordingly, MG1 rotation speed Ng becomes negative, so that battery 700 is discharged. Accordingly, battery 700 can be prevented from being brought into the overcharged state. Then, ECU 1000 returns the process to the main routine and the series of processes shown in FIG. 10 are repeated.

It should be noted that when motor generator MG2 has a malfunction, the combination of gear stages for switching MG1 rotation speed Ng to be positive or negative is not limited to the third speed gear stage and the fourth speed gear stage. The combination of gear stages is appropriately selected according to engine speed Ne and MG2 rotation speed Nm at each time. The same control can be applied to, for example, switching between the second speed gear stage and the third speed gear stage or switching between the second speed gear stage and the fourth speed gear stage.

Finally, referring to FIG. 1 again, the present embodiment will be summarized. A vehicle 1 includes an engine 100, motor generators MG1, MG2, a power split device 300, a propeller shaft 430, an automatic transmission 500, and an ECU 1000 that controls automatic transmission 500. Power split device 300 includes a carrier CA, a sun gear S, and a ring gear R respectively coupled to a crankshaft 110 of engine 100, a rotor 410 of motor generator MG1, and a rotation shaft 415 of motor generator MG2. Automatic transmission 500 is provided between motor generator MG2 and propeller shaft 430.

When motor generator MG1 has a malfunction, ECU 1000 restricts gear shift performed by automatic transmission 500, as compared with a case where motor generator MG2 has a malfunction.

Preferably, automatic transmission 500 is a multi-stage transmission having a plurality of gear stages (a first speed gear stage to a fourth speed gear stage). When motor generator MG1 has a malfunction, ECU 1000 controls automatic transmission 500 to select a direct connection stage (third speed gear stage), which has a gear shift ratio of 1, from the plurality of gear stages.

Preferably, a gear shift diagram (FIG. 6) used when motor generator MG1 has a malfunction, has a region indicating the direct connection stage and wider than that in a gear shift diagram (FIG. 4) used when motor generator MG1 does not have a malfunction.

Preferably, the gear shift diagram used when motor generator MG1 has a malfunction is a gear shift diagram for switching between the direct connection stage and a first speed stage, the first speed stage having a gear shift ratio larger than the gear shift ratio in the direct connection stage. The gear shift diagram used when motor generator MG1 does not have a malfunction is a gear shift diagram for switching among gear stages more than the gear stages in the gear shift diagram used when motor generator MG1 has a malfunction.

Preferably, the vehicle further includes a battery 700 charged/discharged according to rotation of motor generator MG1. When motor generator MG2 has a malfunction, ECU 1000 causes automatic transmission 500 to perform the gear shift based on an SOC of battery 700.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle comprising:
an internal combustion engine;
a first rotating electrical machine;
a second rotating electrical machine;
a power split device including first to third rotating elements respectively coupled to an output shaft of said internal combustion engine and rotation shafts of said first rotating electrical machine and said second rotating electrical machine;
a drive shaft;
a transmission provided between said second rotating electrical machine and said drive shaft; and
an electronic control unit that controls said transmission, wherein
when said first rotating electrical machine has a malfunction, said electronic control unit restricts gear shift performed by said transmission, as compared with a case where said second rotating electrical machine has a malfunction.

2. The vehicle according to claim 1, further comprising:
a power storage device charged/discharged according to rotation of said first rotating electrical machine, wherein
when said second rotating electrical machine has a malfunction, said electronic control unit causes said transmission to perform the gear shift based on a state of charge of said power storage device.

3. The vehicle according to claim 1, wherein
said transmission is a multi-stage transmission having a plurality of gear shift stages, and
when said first rotating electrical machine has a malfunction, said electronic control unit controls said transmission to select a direct connection stage, which has a gear shift ratio of 1, from said plurality of gear shift stages.

4. The vehicle according to claim 3, further comprising:
a power storage device charged/discharged according to rotation of said first rotating electrical machine, wherein
when said second rotating electrical machine has a malfunction, said electronic control unit causes said transmission to perform the gear shift based on a state of charge of said power storage device.

5. The vehicle according to claim 3, wherein
said electronic control unit has a pre-stored first gear shift diagram and a pre-stored second gear shift diagram, said electronic control unit uses said pre-stored first gear shift diagram when said first rotating electrical machine has a malfunction, said pre-stored first gear shift diagram has a first region indicating said direct connection stage, said first region of said pre-stored first gear shift diagram is wider than a second region of said pre-stored second gear shift diagram used when said first rotating electrical machine does not have a malfunction.

6. The vehicle according to claim 5, further comprising:
a power storage device charged/discharged according to rotation of said first rotating electrical machine, wherein when said second rotating electrical machine has a malfunction, said electronic control unit causes said transmission to perform the gear shift based on a state of charge of said power storage device.

7. The vehicle according to claim 5, wherein
said pre-stored first gear shift diagram is a gear shift diagram for switching between said direct connection stage and a first speed stage, the first speed stage having a gear shift ratio larger than the gear shift ratio in said direct connection stage, and
said pre-stored second gear shift diagram is a gear shift diagram for switching among gear shift stages more than the gear shift stages in said pre-stored first gear shift diagram.

8. The vehicle according to claim 7, further comprising:
a power storage device charged/discharged according to rotation of said first rotating electrical machine, wherein
when said second rotating electrical machine has a malfunction, said electronic control unit causes said transmission to perform the gear shift based on a state of charge of said power storage device.

* * * * *

UNITED STATES PATENT AND TRADEMARK OFFICE
CERTIFICATE OF CORRECTION

| | | |
|---|---|---|
| PATENT NO. | : 9,254,739 B2 | |
| APPLICATION NO. | : 14/493910 | |
| DATED | : February 9, 2016 | |
| INVENTOR(S) | : Kenji Uchida | |

It is certified that error appears in the above-identified patent and that said Letters Patent is hereby corrected as shown below:

IN THE SPECIFICATION

In Column 2, Line 29, after "(A/T) 500, inverters", delete "(NV)" and insert --(INV)--, therefor.

Signed and Sealed this
Third Day of May, 2016

Michelle K. Lee
*Director of the United States Patent and Trademark Office*